United States Patent
Nasu et al.

(10) Patent No.: US 7,831,551 B2
(45) Date of Patent: *Nov. 9, 2010

(54) BACKUP DATA ERASURE METHOD

(75) Inventors: Hiroshi Nasu, Yokohama (JP); Yuichi Taguchi, Sagamihara (JP); Noriko Nakajima, Machida (JP)

(73) Assignee: Hitachi, Ltd., Tokyo (JP)

( * ) Notice: Subject to any disclaimer, the term of this patent is extended or adjusted under 35 U.S.C. 154(b) by 365 days.

This patent is subject to a terminal disclaimer.

(21) Appl. No.: 12/030,529

(22) Filed: Feb. 13, 2008

(65) Prior Publication Data

US 2009/0063596 A1   Mar. 5, 2009

(30) Foreign Application Priority Data

Sep. 5, 2007   (JP)   ............................. 2007-230345

(51) Int. Cl.
  *G06F 7/00*   (2006.01)
  *G06F 17/00*   (2006.01)
  *G06F 13/00*   (2006.01)
  *G06F 13/28*   (2006.01)
(52) U.S. Cl. ..................... 707/610; 707/640; 711/162
(58) Field of Classification Search ................. 707/640, 707/610; 711/162
  See application file for complete search history.

(56) References Cited

U.S. PATENT DOCUMENTS

| | | | |
|---|---|---|---|
| 6,304,948 B1* | 10/2001 | Motoyama et al. | 711/162 |
| 6,507,911 B1* | 1/2003 | Langford | 713/193 |
| 2002/0054555 A1* | 5/2002 | Karakawa et al. | 369/53.33 |
| 2003/0149736 A1* | 8/2003 | Berkowitz et al. | 709/213 |
| 2003/0233617 A1* | 12/2003 | Hirai | 715/513 |
| 2005/0015407 A1* | 1/2005 | Nguyen et al. | 707/200 |
| 2005/0071710 A1* | 3/2005 | Micka et al. | 714/6 |
| 2006/0095704 A1 | 5/2006 | Eguchi et al. | |
| 2007/0005659 A1 | 1/2007 | Lemoal et al. | |

FOREIGN PATENT DOCUMENTS

| JP | 2005-209149 | 8/2005 |
|---|---|---|
| JP | 2007-11522 | 1/2007 |

OTHER PUBLICATIONS

U.S. Appl. No. 12/030,545, filed Feb. 2008, Taguchi et al.

* cited by examiner

*Primary Examiner*—Charles E Lu
(74) *Attorney, Agent, or Firm*—Brundidge & Stanger, P.C.

(57) ABSTRACT

According to this invention, a computer system has a host computer, a first storage subsystem providing a first volume, a second storage subsystem providing a second volume for storing a copy of data stored in the first volume. The computer system stores copy configuration information including correspondence between the first volume and the second volume. The management computer transmits the data erasure request to the first storage subsystem upon reception of a first data erasure request for erasing the first volume. The first storage subsystem stops a copying process of data stored in the first volume to the second volume, transmits a second data erasure request for erasing the second volume to the second storage subsystem, and erases the data stored in the first volume. Thus, in the case of erasing data stored in a storage area, corresponding data stored in a destination storage area is also erased so that security risks can be reduced.

12 Claims, 17 Drawing Sheets

| RAID GROUP IDENTIFICATION INFORMATION | MAGNETIC DISK DRIVE IDENTIFICATION INFORMATION | | | |
|---|---|---|---|---|
| | #1 | #2 | #3 | #4 |
| RG-01 | HD-01 | HD-02 | HD-03 | HD-04 |
| RG-11 | HD-11 | HD-12 | HD-13 | HD-14 |
| ... | ... | ... | ... | ... |

| STORAGE AREA IDENTIFICATION INFORMATION | RAID GROUP IDENTIFICATION INFORMATION | START BLOCK ADDRESS | END BLOCK ADDRESS | UPDATE PERMISSION/ INHIBITION INFORMATION |
|---|---|---|---|---|
| LD-01 | RG-01 | 0x0001 | 0x0100 | YES |
| LD-02 | RG-02 | 0x0101 | 0x0200 | YES |
| LD-03 | RG-02 | 0x0201 | 0x0300 | NO |
| LD-04 | RG-03 | 0x0101 | 0x0500 | YES |
| ... | ... | ... | ... | ... |

| COMMUNICATION INTERFACE IDENTIFICATION INFORMATION | STORAGE UNIT IDENTIFICATION INFORMATION | STORAGE AREA IDENTIFICATION INFORMATION |
|---|---|---|
| 50:00:01:1E:0A:E8:02 | LU-11 | LD-01 |
| 50:00:01:1E:0A:E8:02 | LU-12 | LD-03 |
| 50:00:01:1E:0A:E8:03 | LU-11 | LD-04 |
| 50:00:01:1E:0A:E8:03 | LU-12 | LD-11 |
| 50:00:01:1E:0A:E8:03 | LU-13 | LD-12 |
| ... | ... | ... |

FIG. 9

| SOURCE STORAGE AREA IDENTIFICATION INFORMATION | DESTINATION STORAGE SYSTEM IDENTIFICATION INFORMATION | DESTINATION STORAGE AREA IDENTIFICATION INFORMATION | COPY TIME |
|---|---|---|---|
| LD-01 | ST-02 | LD-01 | 2007/01/01 0:15 |
| LD-02 | ST-02 | LD-02 | 2007/01/03 0:45 |
| LD-03 | ST-02 | LD-03 | 2007/01/03 0:45 |
| LD-11 | ST-02 | LD-11 | 2007/1/02 4:05 |
| ... | ... | ... | ... |

FIG. 10A

| SOURCE STORAGE SYSTEM IDENTIFICATION INFORMATION | SOURCE STORAGE AREA IDENTIFICATION INFORMATION | DESTINATION STORAGE SYSTEM IDENTIFICATION INFORMATION | DESTINATION STORAGE AREA IDENTIFICATION INFORMATION | COPY TIME |
|---|---|---|---|---|
| ST-01 | LD-01 | ST-02 | LD-01 | 2007/01/01 0:15 |
| ST-01 | LD-02 | ST-02 | LD-02 | 2007/01/03 0:45 |
| ST-01 | LD-03 | ST-02 | LD-03 | 2007/01/03 0:45 |
| ST-02 | LD-11 | ST-03 | LD-11 | 2007/1/04 1:05 |
| ST-01 | LD-11 | ST-02 | LD-11 | 2007/1/02 4:05 |
| ... | ... | ... | ... | ... |

FIG. 10B

| BLOCK ADDRESS | UPDATE INFORMATION |
|---|---|
| 0x0001 | NO |
| 0x0002 | YES |
| 0x0003 | YES |
| 0x0004 | NO |
| ... | ... |

FIG. 11

BACKUP DATA ERASURE METHOD

CROSS-REFERENCE TO RELATED APPLICATION

The present application claims priority from Japanese patent application JP 2007-230345 filed on Sep. 5, 2007, the content of which is hereby incorporated by reference into this application.

BACKGROUND

This invention relates to a technology of erasing data stored in a storage system, and more particularly, to a technology of erasing a copy of data of an erasure target.

A storage area network (SAN) for connecting at least one external storage device with at least one computer has been known. The storage area network is especially useful when a plurality of computers share one large storage device. A storage system that includes such a storage area network has high extendibility because a storage device or a computer can be easily added thereto and eliminated therefrom.

For the external storage device connected to the SAN, a disk array device is generally used. The disk array device is a device on which many storage devices (such as magnetic disk drives) represented by hard disks are mounted.

The disk array device manages several magnetic disk drives as one group of redundant array of independent disks (RAID) by a RAID technology. The RAID group forms at least one logical storage area. The computer connected to the SAN executes a data I/O process in the storage area. The disk array device records redundant data in the magnetic disk drive of the RAID group when data is recorded in the storage area. Data can be restored from the redundant data even when one of the magnetic disk drives fails.

Additionally, a remote copy technology of copying data recorded in the disk array device to another disk array device has been known. By arranging a destination disk array device at a remote place, data loss damage caused by system failures, disasters, or the like can be suppressed.

A storage area of an erasure target is overwritten with dummy data to erase the data recorded in the magnetic disk drive. However, when the overwriting of dummy data is carried out only once, restoration of data may be allowed because of residual magnetism. Thus, a technology of completely erasing residual magnetism by repeating dummy data overwriting at least three or more times has been disclosed (refer to JP 2007-11522 A). Security risks can be reduced by completely erasing the residual magnetism to prevent data restoration.

A magnetic disk medium (hard disk drive) has widely been used for storing data. The data recorded in the magnetic disk medium has a characteristic in that it is restorable, because it is not completely erased through a simple file erasure operation or a volume formatting process. Especially because of magnetic disk characteristics, residual magnetism may remain on the medium, causing data restoration, when data overwriting is carried out only once, or after the formatting process.

A recent growing concern about security has been accompanied by a demand for a technology of completely erasing stored data. Therefore, a complete erasure process that repeats dummy data overwriting a plurality of times is useful for completely removing the residual magnetism from the magnetic disk.

On the other hand, even if the data stored in the storage device is completely erased, when backup data is stored, the data may leak from the backup data. Erasure of data may become difficult especially when management of backup data generated in the past is insufficient.

Moreover, in a case of creating a backup of the data of the magnetic disk drive in the magnetic disk drive, even when a source data area is overwritten a plurality of times to completely erase data, and replaced by zero data, overwriting is carried out only once in a destination data area if the zero data is only copied to a destination disk. As a result, residual magnetism remains, creating a possibility of data restoration.

In a remote copy environment, if the source storage area is overwritten a plurality of times to completely erase the data during data copy execution from the storage area of the source disk array device to the storage area of the destination disk array device, all the overwritten data are transferred to the destination disk array device. Thus, a great deal of traffic may adversely be generated in a remote copy network.

SUMMARY

A representative aspect of this invention is as follows. That is, there is provided a computer system comprising: a host computer; a first storage system coupled to the host computer via a network; a second storage system coupled to the first storage system; and a management computer having access to the host computer, the first storage system and the second storage system. The first storage system comprises a first interface coupled to the network, a first processor coupled to the first interface, and a first memory coupled to the first processor, and provides a first volume for reading/writing data to the host computer. The second storage system comprises a second interface coupled to the first storage system, a second processor coupled to the second interface, and a second memory coupled to the second processor, and provides a second volume for storing a copy of data stored in the first volume The management computer comprises a third interface coupled to the first storage system and the second storage system, a third processor coupled to the third interface, and a third memory coupled to the third processor. The computer system stores copy configuration information including correspondence between the first volume and the second volume. The management computer transmits a data erasure request to the first storage system upon reception of an erasure request of the data stored in the first volume. The first storage system is configured to: judge whether the second volume corresponding to the first volume exists based on the copy configuration information; stop a copying process of the data stored in the first volume to the second volume in a case of existing the second volume; transmit an erasure request of data stored in the second volume to the second storage system; erase the data stored in the first volume; and output a notification of the erasure of the data stored in the first volume to the management computer.

According to the aspect of this invention, in the remote copy environment, when the data stored in the storage area is erased, by further erasing the copy of the data (backup or archive) stored in the remote copy destination, security risks can be reduced.

BRIEF DESCRIPTION OF THE SEVERAL VIEWS OF THE DRAWING

The present invention can be appreciated by the description which follows in conjunction with the following figures, wherein:

FIG. 7 is an explanatory diagram showing an example of RAID group configuration information stored in the storage system in accordance with the embodiment of this invention;

FIG. 8 is an explanatory diagram showing an example of storage area configuration information stored in the storage system in accordance with the embodiment of this invention;

FIG. 9 is an explanatory diagram showing an example of logical unit configuration information stored in the storage system in accordance with the embodiment of this invention;

FIG. 10A is an explanatory diagram showing an example of copy configuration information stored in the storage system in accordance with the embodiment of this invention;

FIG. 10B is an explanatory diagram showing an example of copy configuration information stored in the management computer in accordance with the embodiment of this invention;

FIG. 11 is an explanatory diagram showing an example of update data information stored in the storage system in accordance with the embodiment of this invention;

DETAILED DESCRIPTION OF THE EMBODIMENTS

Figure 1:
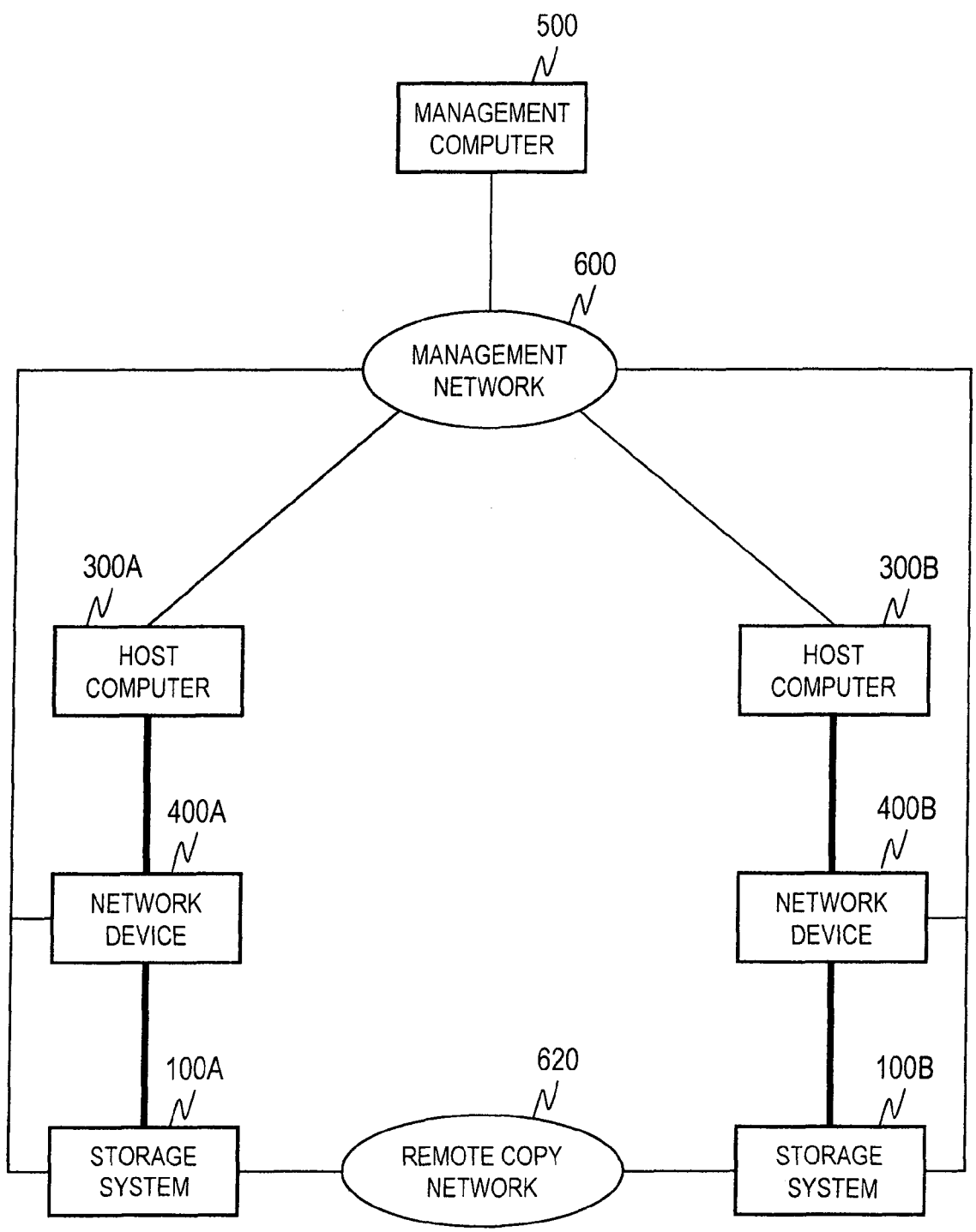
FIG. 1 is a block diagram showing a configuration of a storage area network in accordance with an embodiment of this invention.

Referring to the drawings, the preferred embodiment of this invention will be described below.

FIG. 1 illustrates a configuration of a storage area network according to an embodiment of this invention. The storage area network includes a data I/O network and a management network 600.

The data I/O network includes storage systems 100 (shown as 100A and 100B), host computers 300 (shown as 300A and 300B), and network devices 400 (shown as 400A and 400B). The storage systems 100A and 100B are similar in configuration, and will be described as a storage system 100 for the descriptions in common. The same will apply to a host computer 300 and a network device 400.

The host computer 300 and the storage system 100 are interconnected via the network device 400 to transfer data with each other. The data I/O network is indicated by a thick line in FIG. 1. The data I/O network is a network based on a conventional technology such as a fibre channel or Ethernet (registered trademark).

The management network 600 is a network based on a conventional technology such as a fibre channel or Ethernet. The storage system 100, the host computer 300, and the network device 400 are connected to the management computer 500 via the management network 600.

The storage system 100 includes a storage device such as a magnetic disk drive, and provides a storage area of data read/written by the host computer 300. The storage systems 100A and 100B are interconnected via a remote copy network 620. The remote copy network 620 is a network based on a conventional technology such as a fibre channel or Ethernet.

In the host computer 300, an application such as a database or a file server operates to execute data input/output to a storage area. The network device 400 is a device such as a fibre channel switch for interconnecting the host computer 300 and the storage system 100.

According to the embodiment of this invention, the management network 600 and the data I/O network are independent. However, a single network that serves as both functions may be employed.

Figure 2:
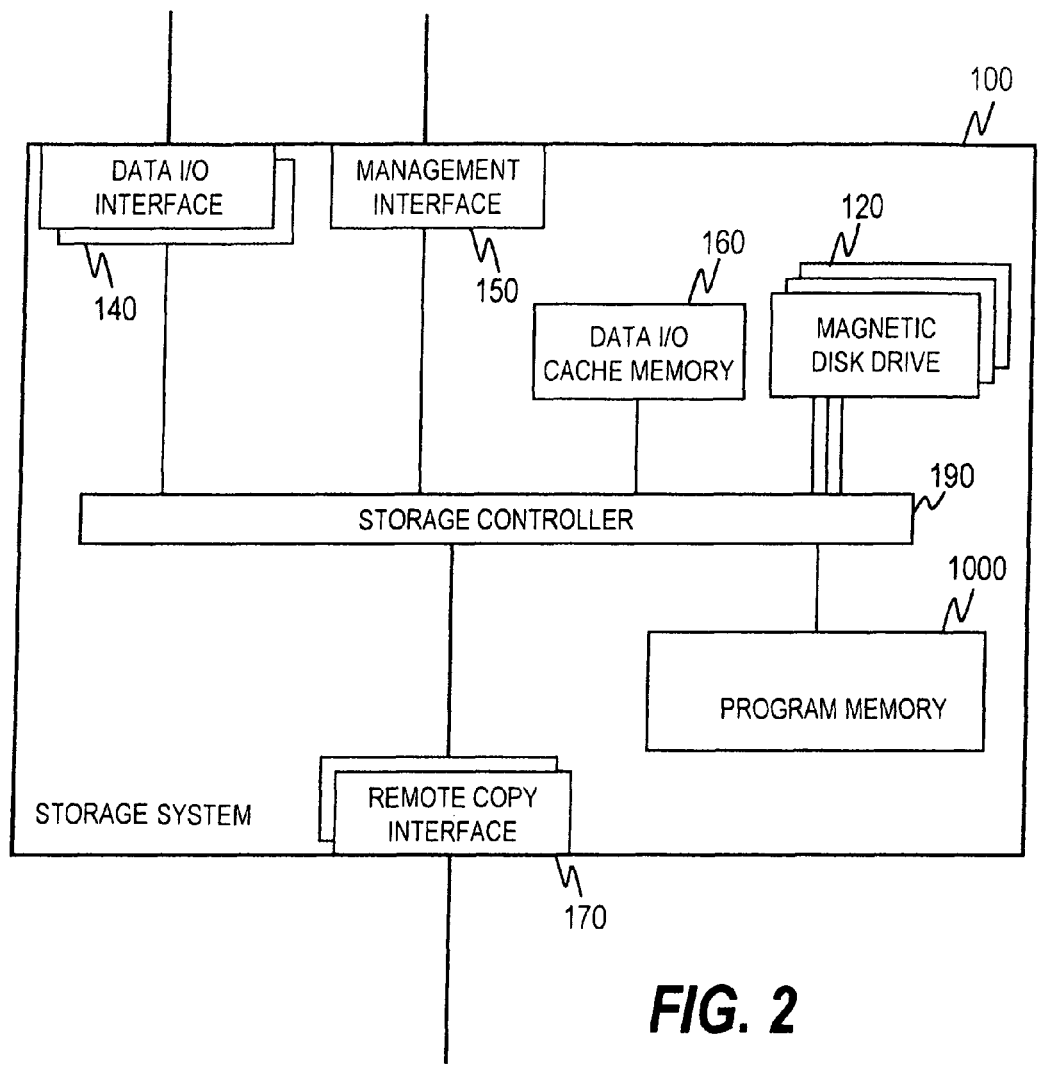
FIG. 2 is a block diagram showing a configuration of a storage system in accordance with the embodiment of this invention.

FIG. 2 illustrates a configuration of the storage system 100 according to the embodiment of this invention.

The storage system 100 includes a data I/O interface 140, a management interface 150, a remote copy interface 170, a storage controller 190, a program memory 1000, a data I/O cache memory 160, and a magnetic disk drive 120. The data I/O interface 140, the management interface 150, the program memory 1000, the data I/O cache memory 160, and the magnetic disk drive 120 are interconnected via the storage controller 190.

The data I/O interface 140 is connected to the network device 400 via the data I/O network. The management interface 150 is connected to the management computer 500 via the management network 600. A remote copy interface 170 is connected to the other storage system 100 to copy data between the storage systems.

The numbers of data I/O interfaces 140, management interfaces 150, and remote copy interfaces 170 are optional. The data I/O interface 140 does not need to have a configuration which is independent of the management interface 150. Management information may be input/output from the data I/O interface 140 to be shared with the management interface 150.

The storage controller 190 includes a processor mounted to control the storage system 100. The data I/O cache memory 160 is a temporary storage area for achieving a high speed of input/output from the host computer 300 to the storage area. The data I/O cache memory 160 generally includes a volatile memory. However, a nonvolatile memory or a magnetic disk drive may be used instead. There is no limit on the number or capacity of data I/O cache memories 160. The magnetic disk drive 120 stores data read/written by the host computer 300.

The program memory 1000 stores a program and control information necessary for a process executed by the storage system 100. The program memory 1000 includes a magnetic disk drive or a volatile semiconductor memory. The control program and the control information stored in the program memory 1000 will be described below referring to FIG. 5.

Figure 3:
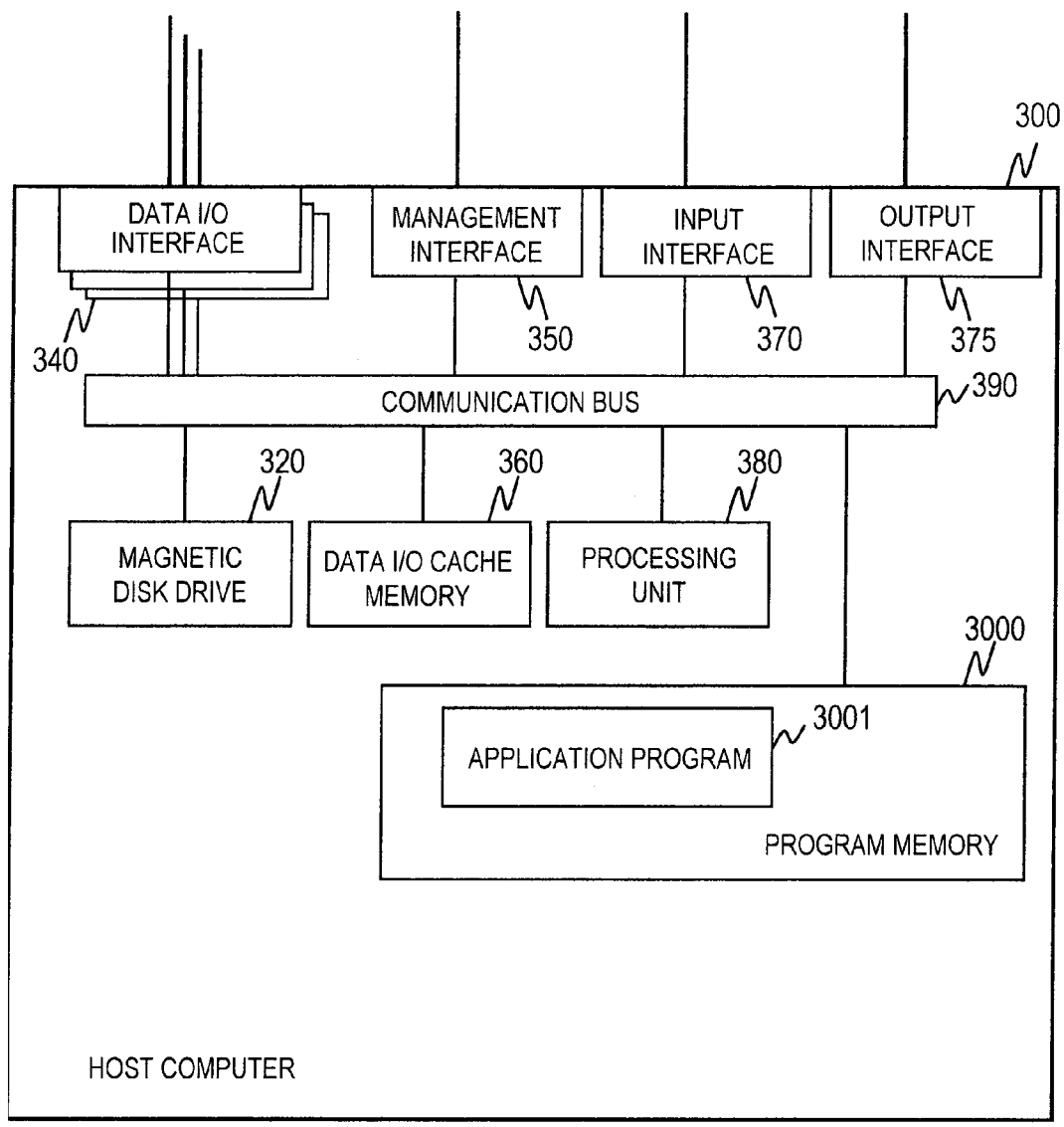
FIG. 3 is a block diagram showing a configuration of a host computer in accordance with the embodiment of this invention.

FIG. 3 illustrates a configuration of the host computer 300 according to the embodiment of this invention.

The host computer 300 includes a data I/O interface 340, a management interface 350, an input interface 370, an output interface 375, a processing unit 380, a magnetic disk drive 320, and a data I/O cache memory 360.

The data I/O interface 340, the management interface 350, the input interface 370, the output interface 375, the processing unit 380, the magnetic disk drive 320, and the data I/O cache memory 360 are interconnected via a communication bus 390. The host computer 300 has a hardware configuration realized by a general-purpose computer (PC).

The data I/O interface 340 is connected to the network device 400 via the data I/O network to input/output data. The management interface 150 is connected to the management computer 500 via the management network 600 to input/output management information. It should be noted that, the numbers of data I/O interfaces 340 and management interfaces 350 are optional. The data I/O interface 340 does not need to have a configuration which is independent of the management interface 350. Management information may be input/output from the data I/O interface 340 to be shared with the management interface 350.

The input interface 370 is connected to a device such as a keyboard or a mouse through which a user enters information. The output interface 375 is connected to a device such as a general-purpose display through which information is output to the user. The processing unit 380 executes various processes, and is equivalent to a CPU or a processor. The magnetic disk drive 320 stores an operating system and software such as an application.

The data I/O cache memory 360 includes a volatile memory, and is used for achieving a high speed of data input/output in the magnetic disk drive 320. The data I/O cache memory 360 generally includes a volatile memory. However, a nonvolatile memory or a magnetic disk drive may be used instead. There is no limit on the number or capacity of data I/O cache memories 360.

The program memory 3000 stores a program and control information necessary for a process executed by the host computer 300. The program memory 3000 includes a magnetic disk drive or a volatile semiconductor memory.

The program memory 3000 stores an application program 3001. The application program 3001 is a program such as a database or an accounting program for creating or updating information stored in the storage system 100.

Figure 4:
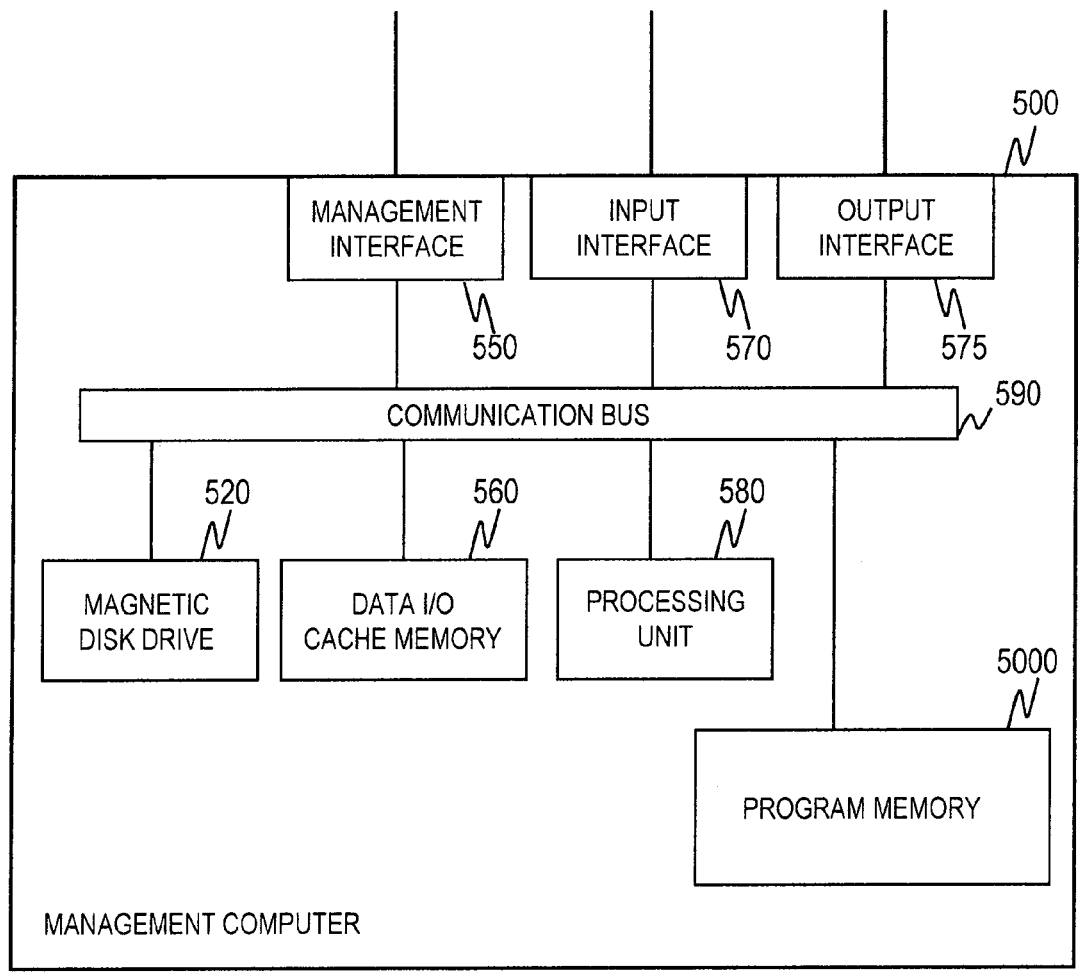
FIG. 4 is a block diagram showing a configuration of a management computer in accordance with the embodiment of this invention.

FIG. 4 illustrates a configuration of the management computer 500 according to the embodiment of this invention.

The management computer 500 includes a data I/O interface 540, a management interface 550, an input interface 570, an output interface 575, a processing unit 580, a magnetic disk drive 520, a program memory 5000, and a data I/O cache memory 560.

The data I/O interface 540, the management interface 550, the input interface 570, the output interface 575, the processing unit 580, the magnetic disk drive 520, the program memory 5000, and the data I/O cache memory 560 are interconnected via a communication bus 590. The management computer 500 has a hardware configuration realized by a general-purpose computer (PC). Functions of the units are similar to those of the host computer 300 shown in FIG. 3.

The program memory 5000 stores a program and information necessary for a process executed by the management computer 500. The program memory 5000 includes a magnetic disk drive or a volatile semiconductor memory. The program and the information stored in the program memory 5000 will be described below referring to FIG. 6.

Figure 5:
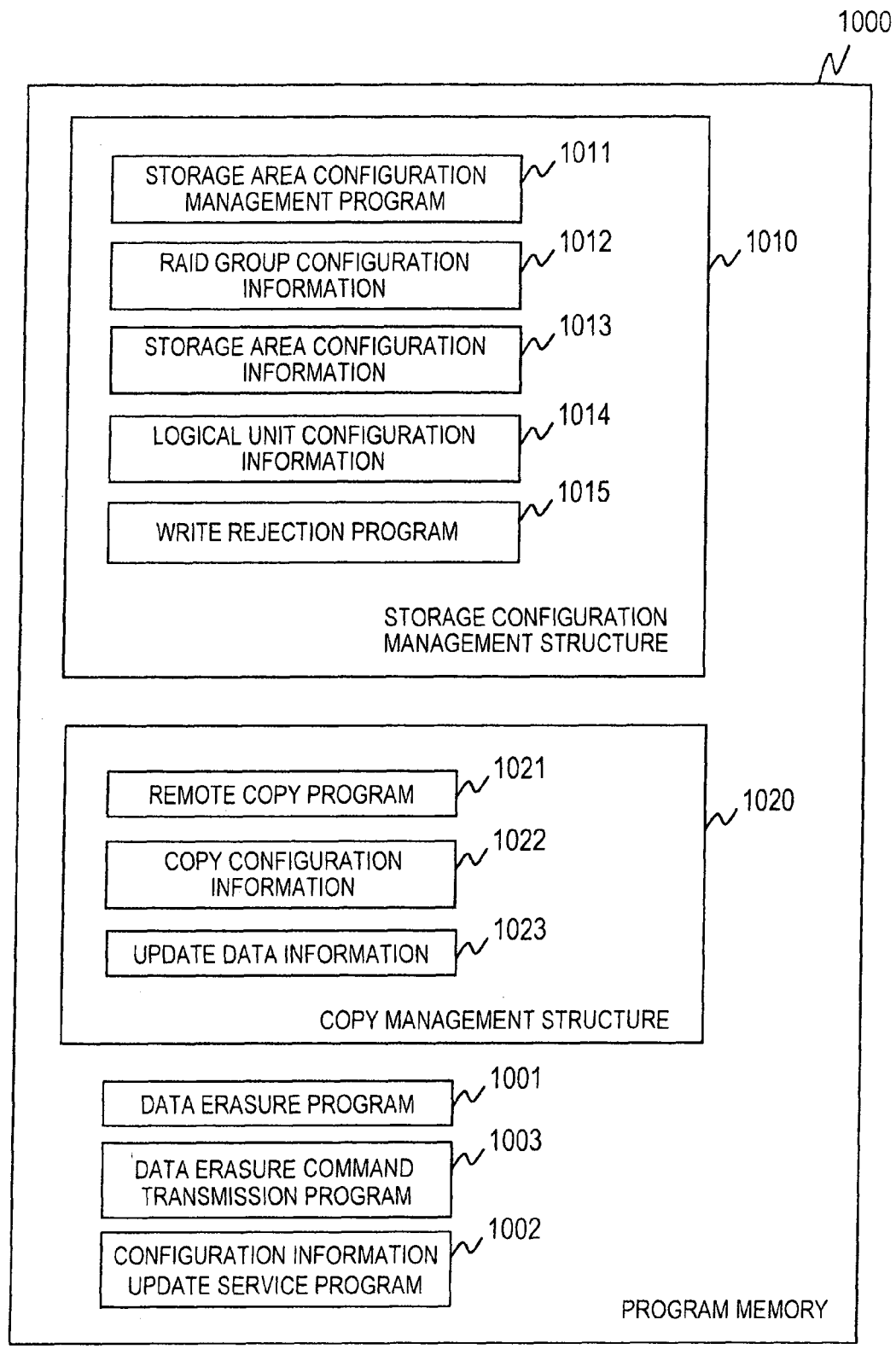
FIG. 5 is a block diagram showing a configuration of a configuration of a control program and control information stored in a program memory of the storage system in accordance with the embodiment of this invention.

FIG. 5 shows examples of a control program and control information stored in the program memory 1000 of the storage system 100 according to the embodiment of this invention.

The program memory 1000 includes a storage configuration management structure 1010, a copy management structure 1020, a data erasure program 1001, and a configuration information update service program 1002.

The storage configuration structure 1010 includes a program and information for managing storage resources provided by the storage system 100 to the host computer 300. Specifically, the storage configuration management structure 1010 includes a storage area configuration management program 1011, RAID group configuration information 1012, storage area configuration information 1013, logical unit configuration information 1014, and a storage area update limitation program 1015.

The storage area configuration management program 1011 is executed by the processor mounted in the storage controller 190 to manage and control storage areas provided to the host computer 300 based on the storage area configuration information 1013 described below.

The RAID group configuration information 1012 is configuration information of a RAID group which includes a set of magnetic disk drives 120. The RAID group configuration information 1012 will be described below in detail referring to FIG. 7.

The storage area configuration information 1013 is configuration information of storage areas which are units of storage resources where the RAID group is divided into logical units. The storage area configuration information 1013 will be described below in detail referring to FIG. 8.

The logical unit configuration information 1014 is configuration information of logical units which are units of storage resources provided to the host computer 300. The logical unit configuration information 1014 will be described below in detail referring to FIG. 9.

The storage area update limitation program 1015 is executed by the storage controller 190 to send an error message in response to a request without executing writing unless writing in a certain storage area is not permitted when writing in the storage area is requested.

The copy management structure 1020 is a program and information for copying data stored in a storage area provided by the storage system 100 to another storage area. The copy management structure 1020 includes a remote copy program 1021, copy configuration information 1022, and data update information 1023.

The remote copy program 1021 is executed by the storage controller 190 to copy data recorded in a source storage area to a destination storage area based on the copy configuration information 1022.

The copy configuration information 1022 contains correspondence relation between a storage area of a copy target and a storage area which becomes a copy destination of the storage area. The copy configuration information 1022 will be described below in detail referring to FIG. 10A.

In the data update information 1023, position information of difference data not copied in the destination storage area is stored for each source storage area when data writing by the host computer 300 updates the source storage area. The data update information 1023 will be described below in detail referring to FIG. 11.

The remote copy program 1021 can complete a copy process not by copying all data stored in the source storage area to the destination storage area but by copying only a difference recorded in the data update information 1023 to the destination storage area in a data copy process.

The data erasure program 1001 is executed by the storage controller 190 to overwrite the storage area with dummy data such as zero data or a random number data a plurality of times. Through overwriting of the storage area with the dummy data a plurality of times, residual magnetism is erased from the magnetic disk drive 120 to completely inhibit data reading. The number of overwriting with the dummy data is, for example, three.

The configuration information update service program 1002 is executed by the processor mounted in the storage controller 190 to transmit configuration information based on a request from the management computer 500.

The data erasure command transmission program 1003 is executed by a processor mounted in the storage controller 190 to transmit an erasure command for erasing data stored in a storage area designated by the other storage system. For example, according to the embodiment of this invention, a copy destination storage area, of a source storage area whose data has been instructed to be erased by the management computer 500, is designated so that a data erasure command for erasing data for stored in the copy destination area is transmitted.

Figure 6:
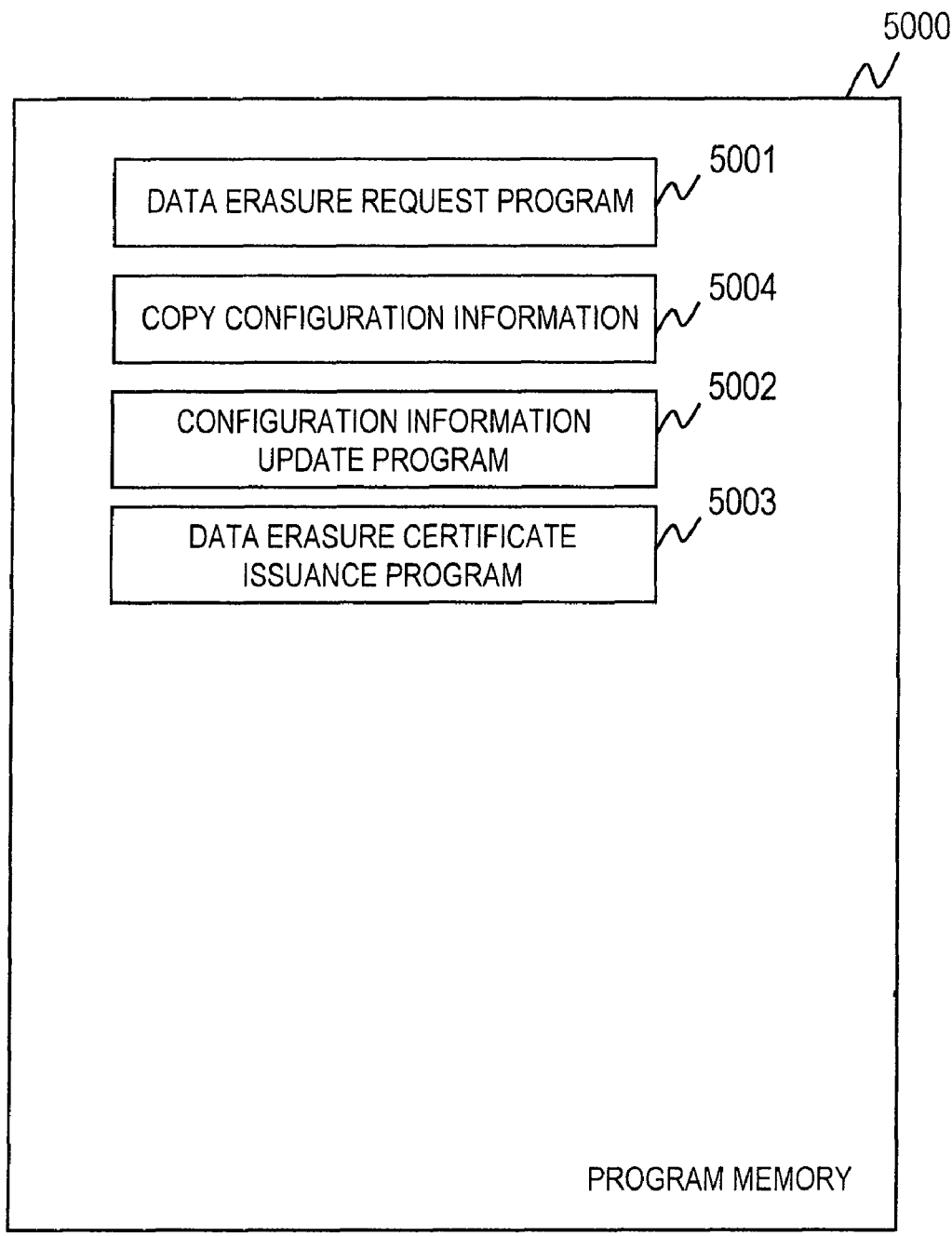
FIG. 6 is a block diagram showing a configuration of a control program and control information stored in a program memory of the management computer in accordance with the embodiment of this invention.

FIG. 6 shows examples of a control program and control information stored in the program memory 5000 of the management computer 500 according to the embodiment of this invention.

The program memory 5000 of the management computer 500 stores a data erasure request program 5001, copy configuration information 5004, a configuration information update program 5002, and a data erasure certificate issuance program 5003.

The data erasure request program 5001 is executed by the processing unit 580 to request data erasure to the storage system 100 based on information input from an administrator.

The configuration information update program 5002 is the program for obtaining and storing configuration information held by the storage system 100. A processing procedure of the configuration information update program 5002 will be described below referring to FIG. 12.

The data erasure certificate issuance program 5003 is the program for providing the erasure certificate to an administrator via the output interface 575. An example of the erasure certificate will be described below referring to FIG. 16.

The copy configuration information 5004 stores information contained in the copy configuration information 1022 collected from the storage system 100 of a management target by executing the configuration information update program 5002.

FIG. 7 shows an example of RAID group configuration information 1012 stored in the storage system 100 according to the embodiment of this invention.

The RAID group configuration information 1012 stores correspondence relation between a RAID group and magnetic disk drives constituting the RAID group. The RAID group configuration information 1012 contains a RAID group ID 10121 and a magnetic disk drive ID 10122.

The RAID group ID 10121 is an identifier for uniquely identifying a RAID group provided in the storage system 100.

The magnetic disk drive ID 10122 is an identifier for uniquely identifying a magnetic disk drive 120 constituting the RAID group specified by the RAID group ID 10121. For example, a RAID group "RG-01" includes magnetic disk drives "HD-01", "HD-02", "HD-03", and "HD-04".

FIG. 8 shows an example of storage area configuration information 1013 stored in the storage system 100 according to the embodiment of this invention.

The storage area configuration information 1013 contains a storage area ID 10131, a RAID group ID 10132, a start block address 10133, an end block address 10134, and update-enabled information 10135.

The storage area ID 10131 is an identifier for identifying a storage area. The RAID group ID 10132 is an identifier for identifying a RAID group. The storage area identified by the storage area ID 10131 is a logical storage area defined by the RAID group identified by the RAID group ID 10132.

The start block address 10133 is a start block address of a physical area for storing a storage area identified by the storage area ID 10131. The end block address 10134 is an end block address of a physical area for storing a storage area identified by the storage area ID 10131.

The update-enabled information 10135 is a security attribute of the storage area identified by the storage area ID 10131. In the update-enabled information 10135 of the embodiment of this invention, "No" is recorded when writing is permitted in the storage area from an external I/O device such as the host computer 300, while "Yes" is recorded when writing is inhibited. According to the embodiment of this invention, an attribute value is represented by a character string. However, the attribute value may be represented by a true/false value of "0" or "1".

Upon execution of the storage area update limitation program 1015, the storage controller 190 of the storage system 100 notifies an error without executing a writing process when the update-enabled information 10135 of the storage area which is a write request target is "No". In other words, storage of data stored in the storage area is guaranteed while the update-enabled information 10135 is "No".

FIG. 9 shows an example of logical unit configuration information 1014 stored in the storage system 100 according to the embodiment of this invention. The logical unit configuration information 1014 stores correspondence among the interface, a logical unit which is a unit of storage resources to be accessed from the host computer 300, and a storage area.

The logical unit configuration information 1014 contains an interface ID 10141, a logical unit ID 10142, and a storage area ID 10143.

The interface ID 10141 is an identifier for uniquely identifying the data I/O interface 140. For example, a world wide name (WWN) is stored in the interface ID 10141.

The logical unit ID 10142 is an identifier for uniquely identifying a logical unit. The logical unit is a unit of storage resources to be accessed from the host computer 300 connected to the storage system 100, and equivalent to a volume mounted in a file system in which the host computer 300 operates.

The storage area ID 10143 is an identifier for uniquely identifying a logical storage area provided by the storage system 100.

FIG. 10A shows an example of copy configuration information 1022 stored in the storage system 100 according to the embodiment of this invention.

The copy configuration information 1022 contains a source storage area ID 10221, a destination storage system ID 10222, a destination storage area ID 10223, and time of copy 10224.

The processor of the storage controller 190 executes the remote copy program 1021 to copy data from a storage area identified by the source storage area ID 10221 in a storage area identified by the destination storage system ID 10222 and the destination storage area ID 10223.

In the time of copy 10224, time of executing remote copying, in other words, backup acquisition time, is stored.

FIG. 10B shows an example of copy configuration information 5004 stored in the management computer 500 according to the embodiment of this invention.

The copy configuration information 5004 contains a source storage system ID 50041, a source storage area ID 50042, a destination storage system ID 50043, a destination storage area ID 50044, and time of copy 50045. Each field stored in the copy configuration information 5004 stored in the management computer 500 corresponds to each field of the copy configuration information 1022 stored in the storage system 100 except for the source storage system ID 50041.

The processing unit 580 of the management computer 500 executes the configuration information update program 5002 to collect the copy configuration information 1022 stored in the storage system 100 of the management target. Then, an identifier of the storage system 100 whose copy configuration information 1022 has been collected is stored in the source storage system ID 50041, and information of the collected copy configuration information 1022 is stored in a corresponding field.

FIG. 11 shows an example of data update information 1023 stored in the storage system 100 according to the embodiment of this invention.

Pieces of data update information 1023 equal in number to pairs of source and destination storage areas are held in the storage system 100. The data update information 1023 contains a block address 10231 and update information 10232.

Position information in the source storage area is stored in the block address 10231. In the update information 10232, "Yes" is recorded when data recorded in the block address 10231 of the source storage area has not been copied in the destination storage area, and "No" is recorded when the data has been copied. According to the embodiment of this invention, a value stored in the update information 10232 is represented by a character string. However, the value may be a difference bitmap represented by a true/false value of "0" or "1".

Figure 12:
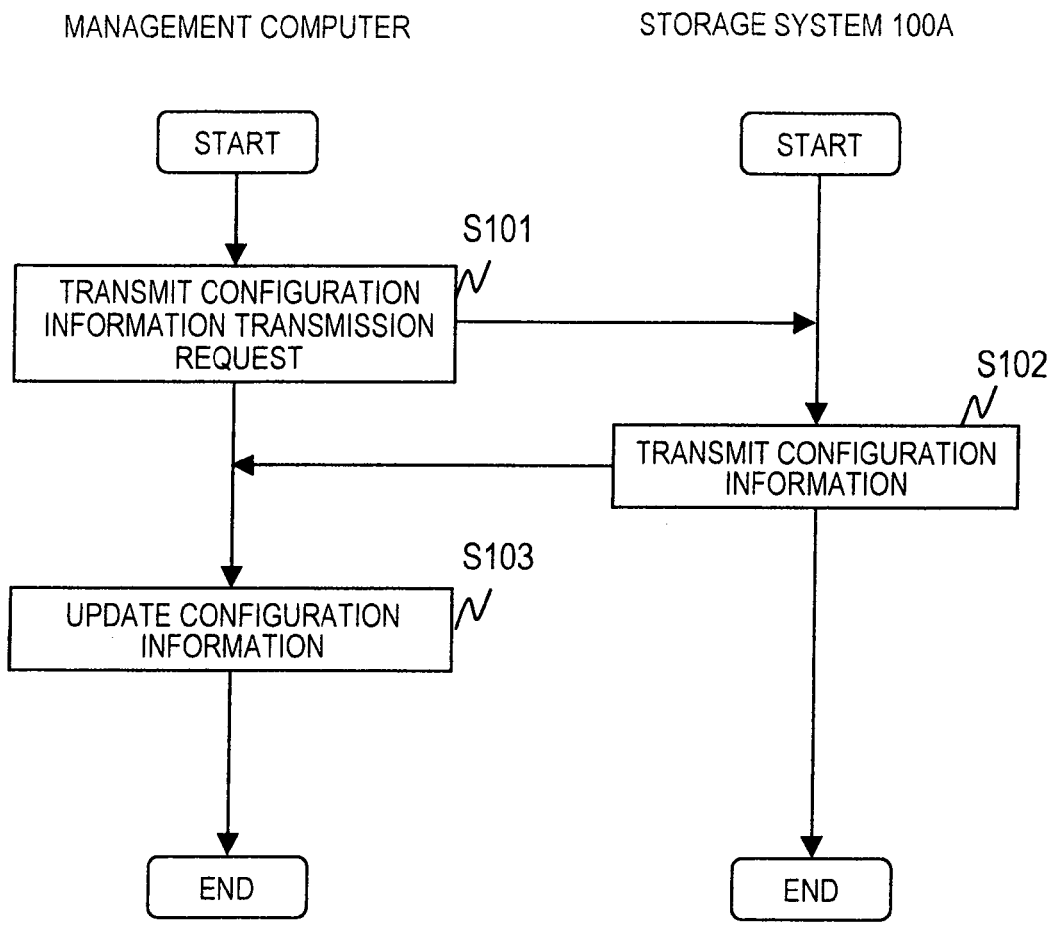
FIG. 12 is a flowchart showing a procedure of updating configuration information of the storage system stored in the management computer in accordance with the embodiment of this invention.

FIG. 12 is a flowchart showing a procedure of updating configuration information of the storage system stored in the management computer 500 according to the embodiment of this invention.

This process is performed by executing the configuration information update program 5002 through the processing unit 580. An outline of this process is that configuration information is obtained from the storage system 100 to update the copy configuration information 1022 and the copy data catalogue information 5101.

The processing unit 580 of the management computer 500 first transmits a configuration information transmission request message to the storage system 100 (step S101). In this case, requested configuration information may be designated in the configuration information transmission request message to obtain only necessary configuration information from the storage system 100.

The storage controller 190 of the storage system 100 executes the configuration information update service program 1002 to receive the configuration information transmission request message, and transmits the configuration information of the storage system 100 to the management computer 500 based on the requested contents (step S102).

Upon reception of the configuration information transmitted from the storage system 100, the processing unit 580 of the management computer 500 updates the copy configuration information 1022 stored in the program memory 5000 (step S103) based on the received configuration information.

Figure 13:
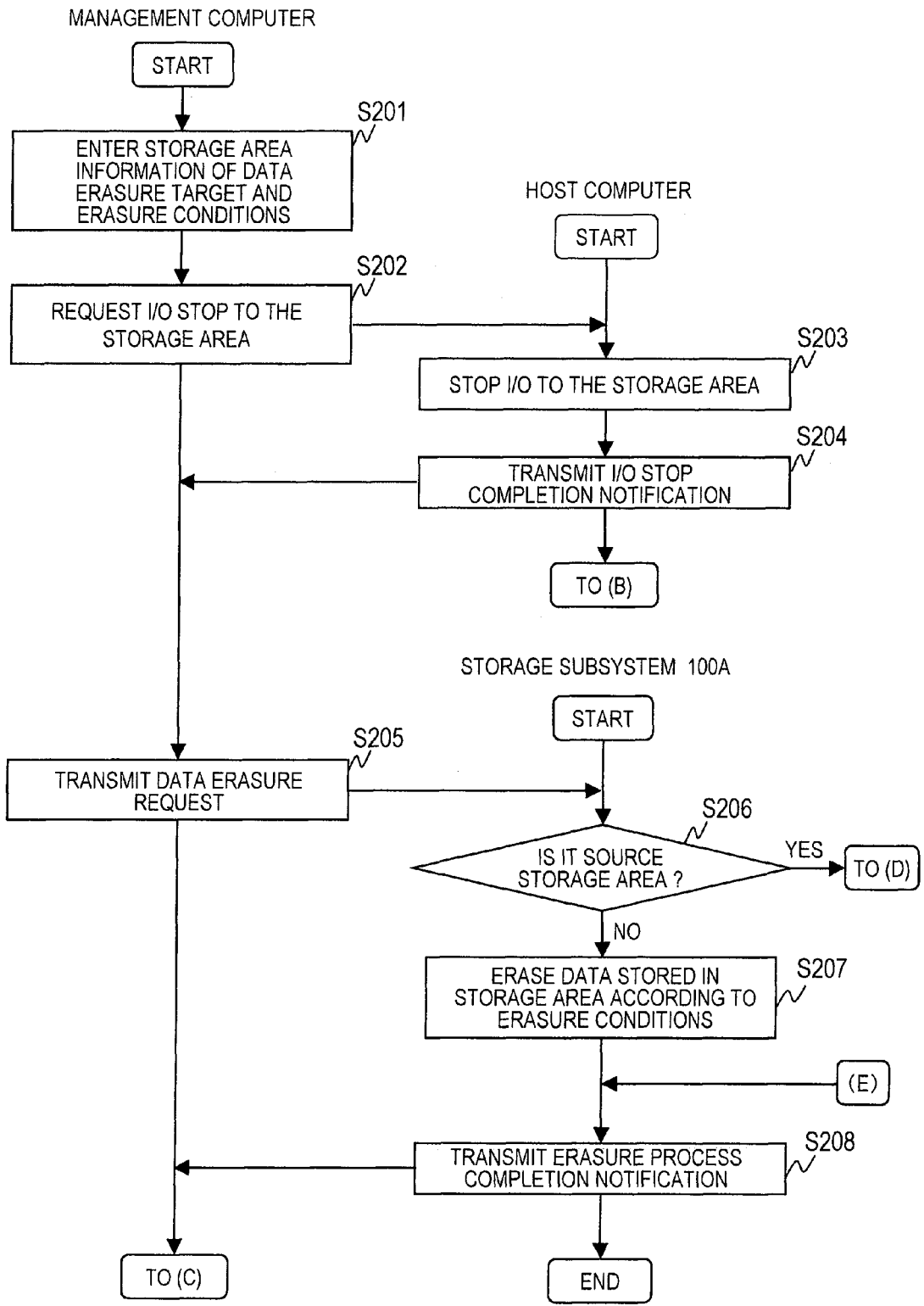
FIG. 13 is a flowchart showing a data erasure processing procedure of a storage area in accordance with the embodiment of this invention.
Figure 14:
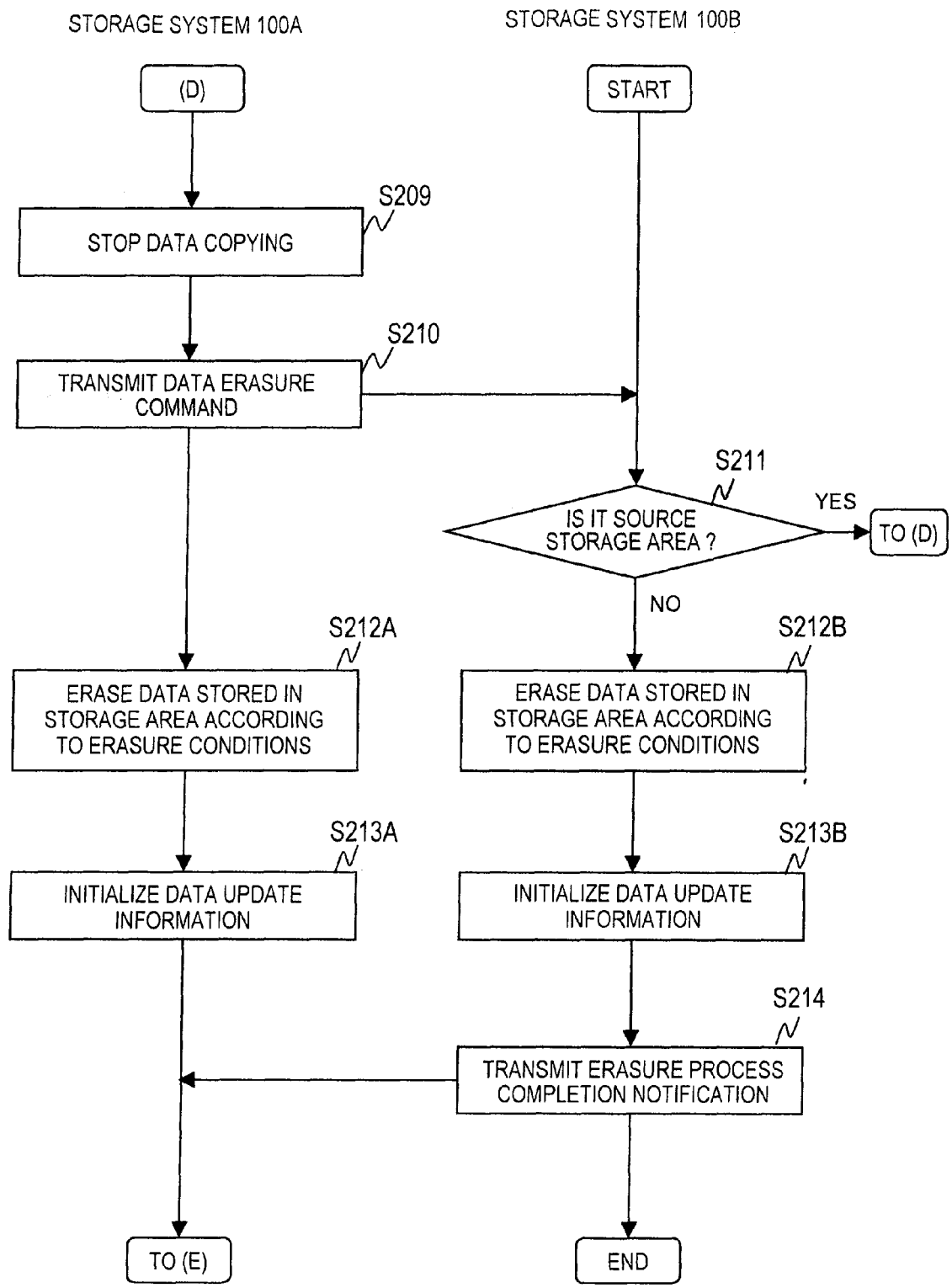
FIG. 14 is a flowchart showing a data erasure processing procedure of a storage area in accordance with the embodiment of this invention.
Figure 15:
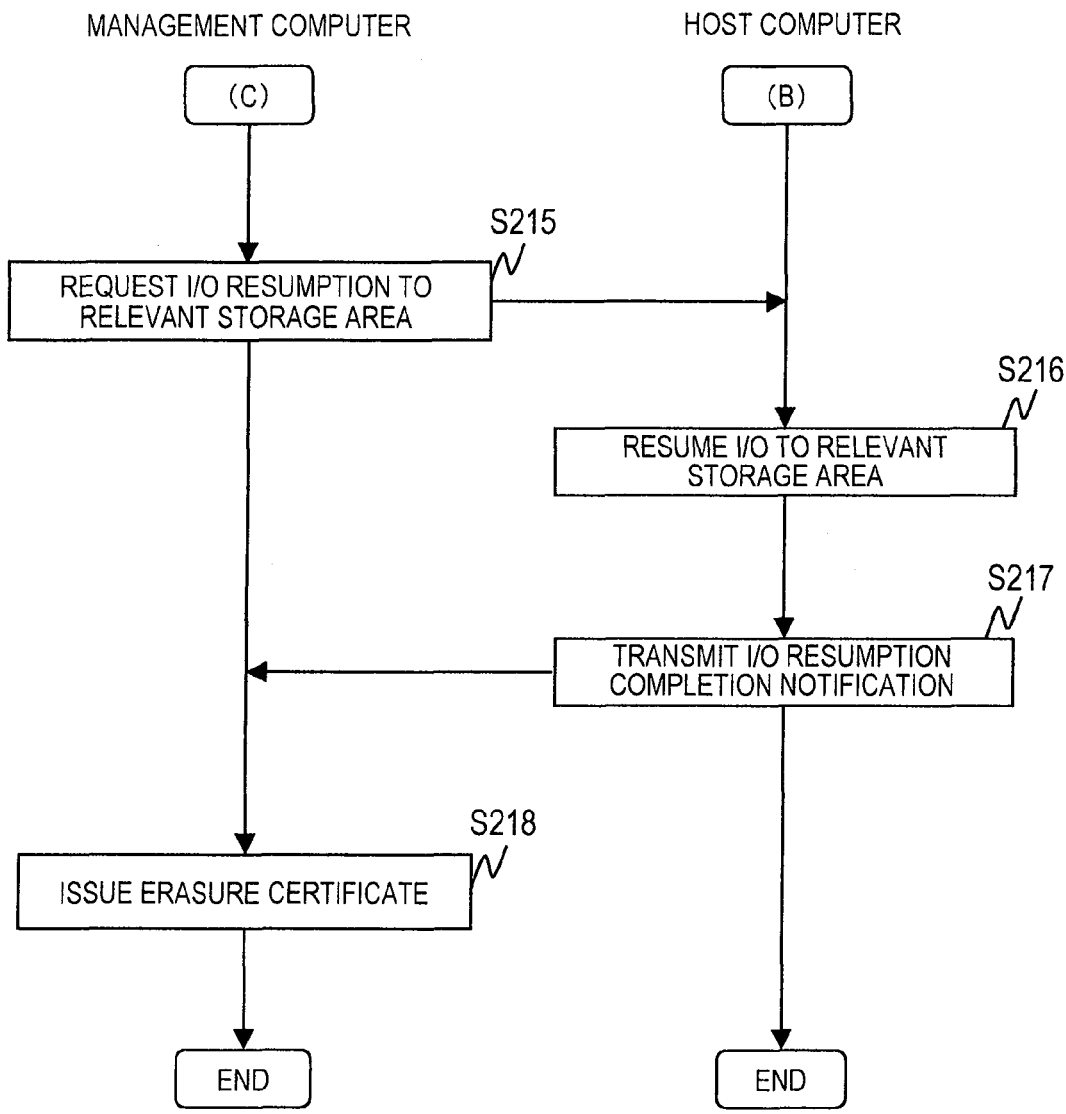
FIG. 15 is a flowchart showing a data erasure processing procedure of a storage area in accordance with the embodiment of this invention.

Referring to FIGS. 13 to 15, a data erasure processing procedure of the storage area according to the embodiment of this invention will be described. The data erasure process is executed by processing the data erasure request program 5001 through the processing unit 580 of the management computer 500.

Referring to flowcharts of FIGS. 13 to 15, a procedure of transmitting a data erasure command from the management computer 500 to the source storage area provided by the storage system 100A, and erasing data stored in the destination storage area provided by the storage system 100B will be described.

FIG. 13 is a flowchart showing a data erasure processing procedure of the storage area according to the embodiment of this invention. The flowchart of FIG. 13 specifically shows a procedure from the transmission of a data erasure command from the management computer 500 to a preprocess of erasing data of the remote copy destination.

The processing unit 580 of the management computer 500 first executes the data erasure request program 5001 to receive an entry of a data erasure request command from the system administrator (step S201). The data erasure request command contains a data erasure target and data erasure conditions. For example, a storage area or a logical unit is designated as a data erasure target. The data erasure conditions include information regarding whether to erase copy data or backup data of data to be erased in addition to the number of overwriting times and a type of overwriting data such as zero data or random data.

Then, the processing unit 580 of the management computer 500 requests an input/output stop in the storage area of the erasure target to the host computer 300 (step S202).

In processing of the application program 3001, the processing unit 380 of the host computer 300 receives the input/output stop request in the storage area of the erasure target to stop reading/writing of data in the storage area of the erasure target (step S203). Additionally, the processing unit 580 transmits an input/output stop completion notification to the management computer 500 (step S204).

Through the process of the steps S202 to S204, the processing unit 580 of the management computer 500 stops the data input/output in the storage area of the erasure target before execution of a data erasure process to remove a possibility of failures caused by an input/output request during the erasure. The embodiment of this invention has been described by way of procedure where the input/output stop is requested to the host computer 300. However, a writing request from the host computer 300 may be rejected by setting "No" in the update-enabled information 10135 contained in the storage area configuration information 1013 of the storage system 100. In this case, not an error but zero data imitating data read from the erased storage area in a pseudo manner may be returned with respect to a reading request.

The processing unit 580 of the management computer 500 transmits a data erasure request message for the storage area of the erasure target to the storage system 100A (step S205).

The storage controller 190 of the storage system 100A receives a data erasure request message from the management computer 500. The storage controller 190 executes the data erasure program 1001, and refers to the copy configuration information 1022 to judge whether a storage area of a data erasure target is a source storage area (step S206).

If the storage area of the data erasure target is not a source storage area (result of the step S206 is "No"), the storage controller 190 of the storage system 100A erases data stored in a designated storage area based on erasure conditions included in the received data erasure request message, and to remove residual magnetism (step S207). Specifically, an area from the starting block address 10133 to the ending block address 10134 is overwritten with zero data or random access data by a designated number of times. Upon completion of the process, the storage controller 190 of the storage system 100A transmits an erasure process completion notification to the management computer 500 (step S208).

FIG. 14 is a flowchart showing a data erasure processing procedure of a storage area according to the embodiment of this invention. The flowchart of FIG. 14 shows a procedure of erasing data from a destination storage area when a volume targeted for data erasure is a source storage area.

If a storage area of a data erasure target is a source storage area (result of the step S206 of FIG. 13 is "Yes"), the storage controller 190 of the storage system 100A executes the remote copy program 1021 to stop the process of copying data stored in the storage area of the data erasure target to the destination storage area (step S209). The stop of the data copying to the destination storage area enables prevention of execution of data copying during data erasure. The destination storage area is provided by the storage system 100B as described above.

The storage controller 190 of the storage system 100A transmits a data erasure request message to the storage system 100B which provides a destination storage area (step S210).

The storage controller 190 of the storage system 100A erases data stored in the designated storage area and removes residual magnetism based on erasure conditions contained in the received data erasure request message (step S212A).

Additionally, the storage controller 190 of the storage system 100A clears the data update information 1023 stored in the storage system 100A (step S213A). The clearance of the data update information 1023 stored in the storage system 100A enables prevention of transfer of all data of the source storage area to the destination storage area after copy resumption of the difference data. It should be noted that, for initialization of the data update information 1023, "No" only needs to be recorded in all of the update information 10232.

Then, the storage controller 190 of the storage system 100A transmits an erasure process completion notification to the management computer 500 (step S208 of FIG. 13).

Upon reception of a data erasure request from the storage system 100A, the storage controller 190 of the storage system 100B executes the remote copy program 1021 to judge whether a storage area of an erasure target is a source storage area (step S211). If the storage area of the erasure target is a source storage area (result of the step S211 is "Yes"), a data erasure command is transmitted to a storage system which provides a destination storage area. A process subsequently executed in the storage system which has received the data erasure command is similar to that of the step S211 and after. Thus, even in the storage system that includes the destination storage area, by judging whether the storage system includes another destination storage area, and transmitting a data erasure command if another destination storage area exists, a cascade configuration shown in FIG. 18 can be dealt with.

If the storage area of the erasure target is not a source storage area (result of the step S211 is "No"), the storage controller 190 of the storage system 100B erases data stored in the designated storage area and removes residual magnetism based on erasure conditions contained in the received data erasure request message (step S212B).

The storage controller 190 of the storage system 100B clears the data update information 1023 stored in the storage system 100B (step S213B). Then, the storage controller 190 of the storage system 100B transmits an erasure process completion notification to the storage system 100A (step S214). In the case of executing data copying between the source and destination storage areas again, the remote copy program 1021 is executed to resume the data copying with the destination storage area.

FIG. 15 is a flowchart showing a data erasure processing procedure according to the embodiment of this invention. The flowchart of FIG. 15 shows a procedure of resuming writing from the host computer 300.

Upon completion of the step S205 of FIG. 13 and reception of the erasure process completion notification from the storage system 100A, the processing unit 580 of the management computer 500 requests data input/output resumption in the storage area of the erasure target to the host computer 300 (step S215).

The processing unit 380 of the host computer 300 resumes the data input/output in the storage area of the erasure target (step S216). The processing unit 380 transmits an input/output resumption completion notification to the management computer 500 (step S217).

The execution of the process of the steps S215 to S217 enables access to the storage area of the erasure target from the host computer 300 again.

Then, the processing unit 580 of the management computer 500 executes the erasure certificate issuance program 5003 to write information of the erased storage area together with erasure conditions and time in an erasure certificate, and to output the erasure certificate from the output interface 575 (step S217). The erasure certificate may be output on a screen, or printed on paper to be output from a printer.

Figure 16:
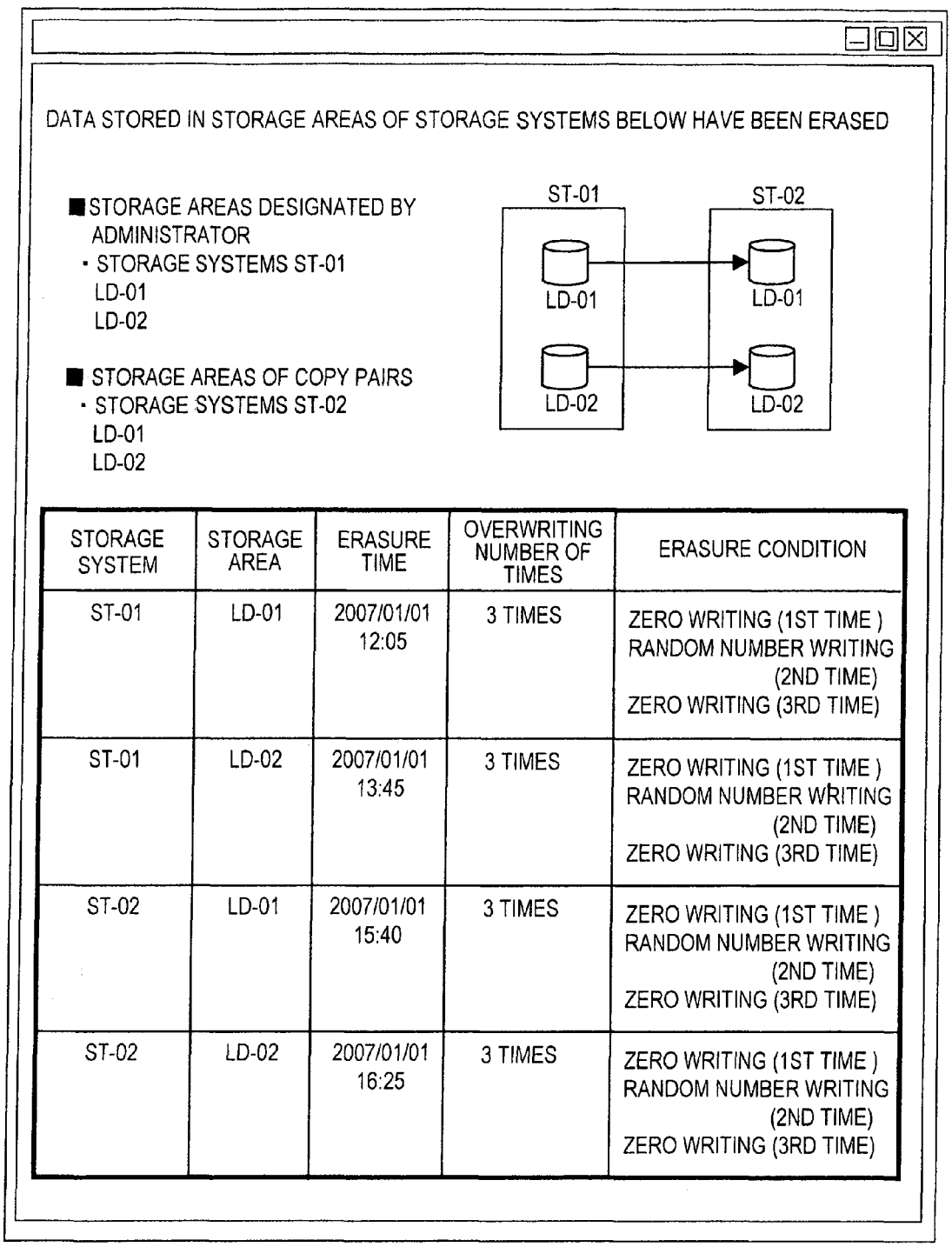
FIG. 16 is an explanatory diagram showing an output example of an erasure certificate in accordance with the embodiment of this invention.

FIG. 16 shows an output example of an erasure certificate according to the embodiment of this invention.

The erasure certificate is issued by executing the erasure certificate issuance program 5003 of the management computer 500.

A list of storage systems and storage areas to which data erasure has been performed is output together with erasure conditions to the erasure certificate. When an erasure target is a remote copy destination (copy-pair) storage area, time of copying data may be specified by writing the time of copy 50045 of the copy configuration information 5004. When the administrator enters information of the source storage area as an erasure target in the step S201, the number and IDs of erased storage areas may also be output to the erasure certificate.

Figure 17:
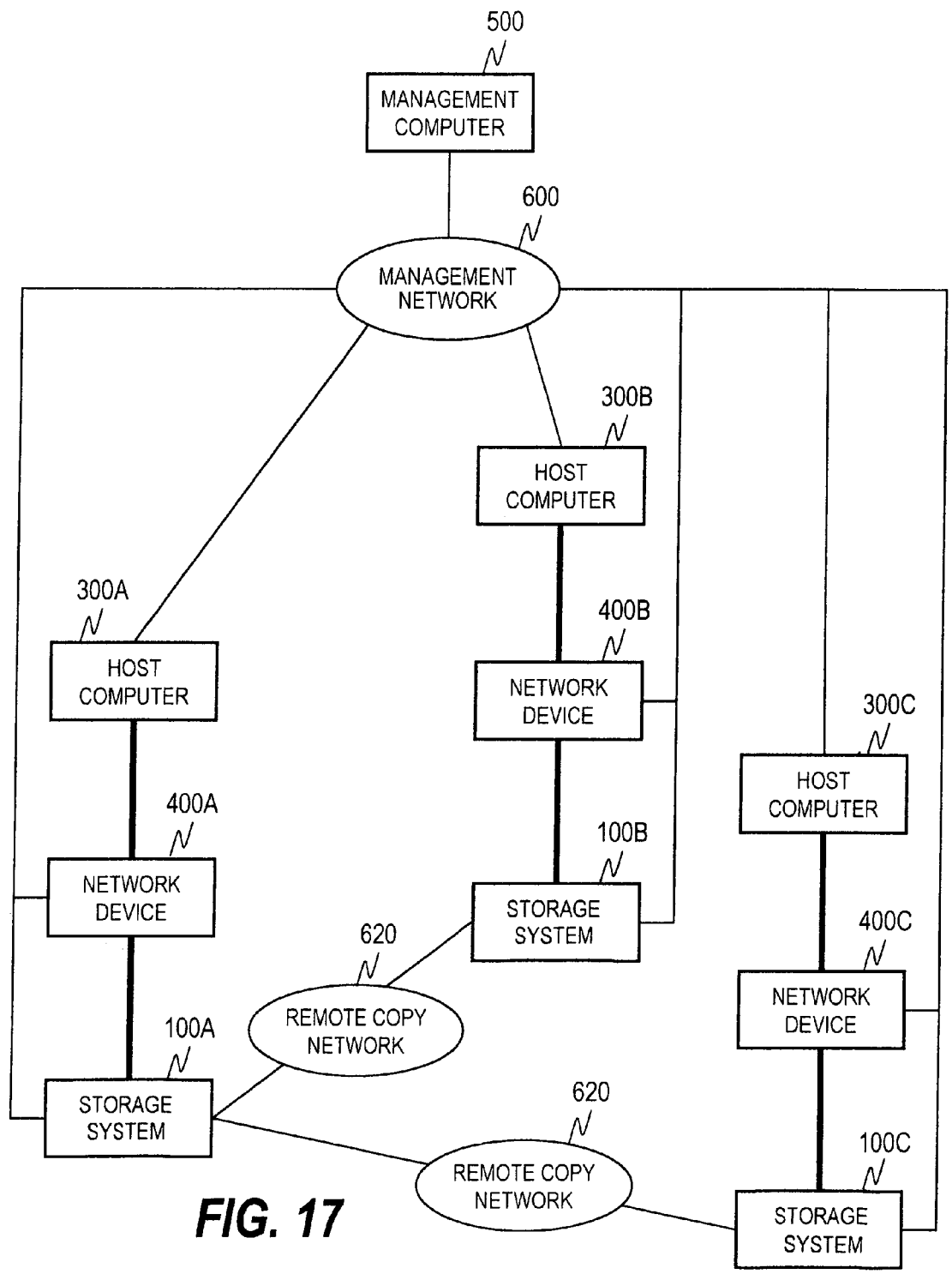
FIG. 17 is a block diagram showing a configuration of a storage area network of a multi-target connection remote copy environment in accordance with the embodiment of this invention.

FIG. 17 illustrates a configuration of a storage area network of a multi-target connection remote copy environment according to the embodiment of this invention.

The storage area network shown in FIG. 17 includes a storage system 100A for storing source data, and storage systems 100B and 100C as destination storage systems. The configuration shown in FIG. 17 is a multi-target connection remote copy environment which includes a plurality of destination storage areas for one source storage area.

In the multi-target connection remote copy environment, to apply this invention, data erasure commands are transmitted to all the storage systems which provide the destination storage areas in the step S210 of FIG. 13. Specifically, all the destination storage areas are obtained from the copy configuration information 1022 in the step S206, and data erasure commands are transmitted to the storage systems 100B and 100C which provide the obtained destination storage areas in step S210.

The copy configuration information 1022 stored in the storage system shown in FIG. 10B has a structure capable of storing a plurality of destination storage system IDs 10222 and destination storage area IDs 10223 for one source storage area ID 10221.

Thus, this invention can be applied to the multi-target connection remote copy environment where the source storage system is connected to the plurality of storage systems.

Figure 18:
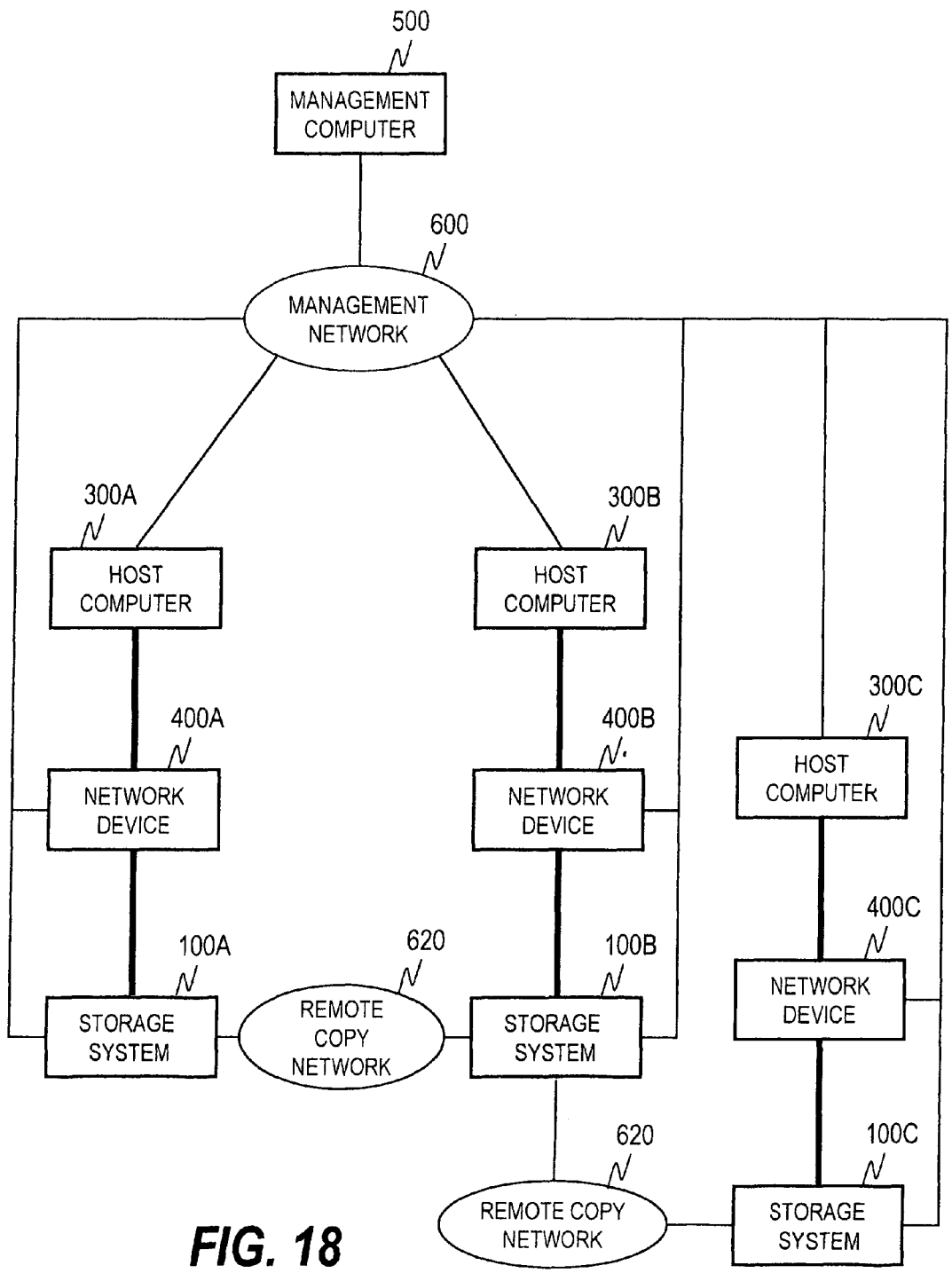
FIG. 18 is a block diagram showing a configuration of a storage area network of a cascade connection remote copy environment in accordance with the embodiment of this invention.

FIG. 18 illustrates a configuration of a storage area network of a cascade connection remote copy environment according to the embodiment of this invention.

The storage area network shown in FIG. 18 includes a storage system 100A which provides a source storage area, and a storage system 100B which provides a destination storage area of the source storage area. The storage area network further includes a storage system 100C which provides a storage area using the destination storage area provided by the storage system 100B as a source storage area. The configuration shown in FIG. 18 is a remote copy environment cascade-connected to further include a destination storage area by using the storage area which becomes a destination storage area as a source storage area.

In the cascade-connected remote copy environment, to apply this invention, when data erasure is requested to the destination storage system, whether a storage area of an erasure target is a source storage area is judged (step S211 of FIG. 14). If the storage area of the erasure target is a source storage area, a data erasure command is transmitted to the destination storage system 100C.

Figure 19:
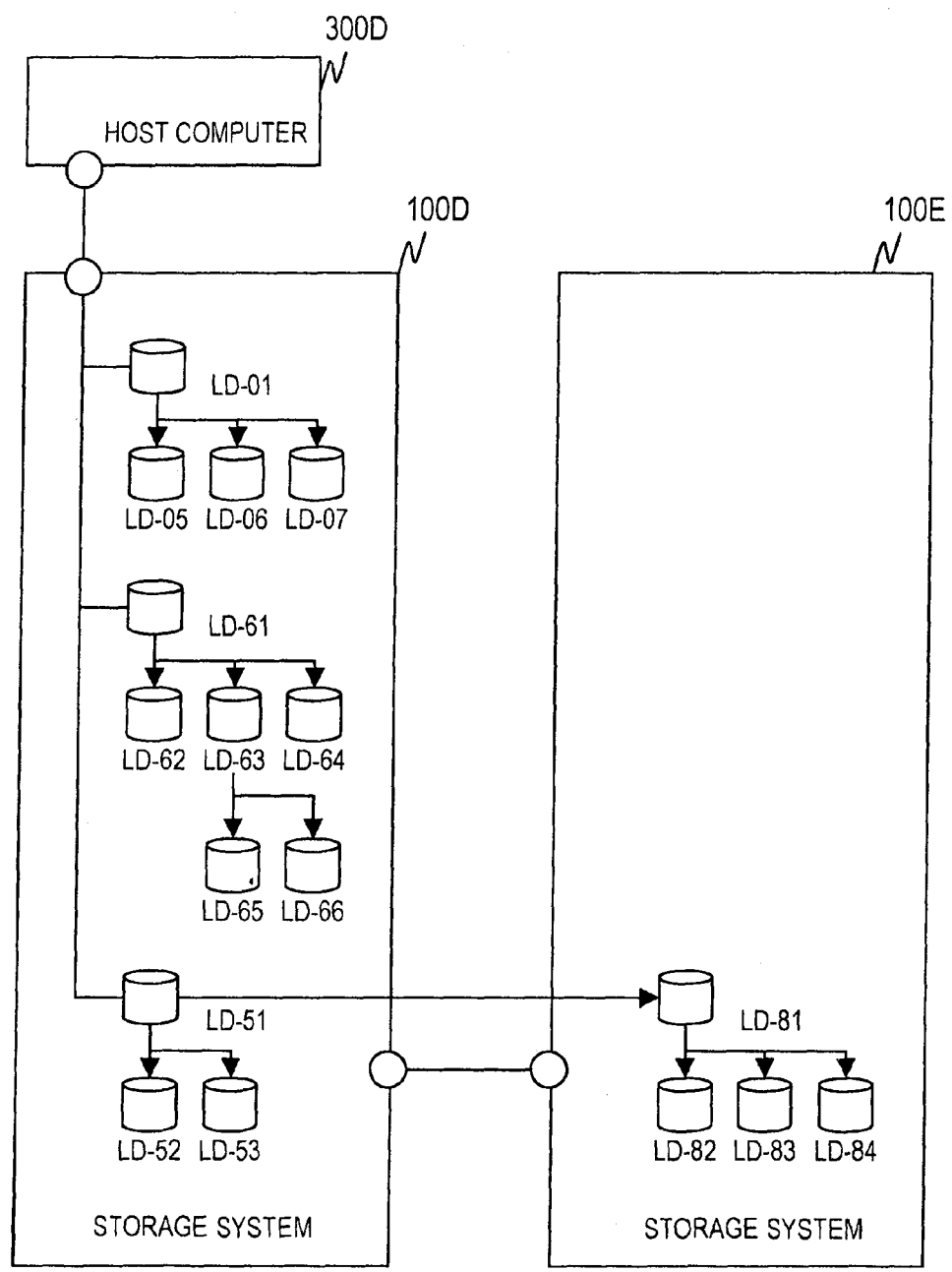
FIG. 19 is an explanatory diagram showing a storage area network including a configuration which has a destination storage area in the same storage system as that which provides the source storage area in accordance with the embodiment of this invention.

FIG. 19 illustrates a storage area network including a configuration which has a destination storage area in the same storage system as that which provides the source storage area according to the embodiment of this invention.

The storage area network shown in FIG. 19 includes storage systems 100D and 100E. In a storage area provided by each storage system, a destination storage area is included in the same storage system.

The destination storage areas of a source storage area "LD-01" are "LD-05", "LD-06", and "LD-07". The storage areas "LD-01", "LD-05", "LD-06", and "LD-07" are all provided by the storage system 100D.

The destination storage areas of a source storage area "LD-61" are "LD-62", "LD-63", and "LD-64". The destination storage areas of the storage area "LD-63" are "LD-65" and "LD-66". The storage area "LD-61" is cascade-connected in the same storage system. The storage areas "LD-62", "LD-63", "LD-64", "LD-65", and "LD-66" are all provided by the storage system 100D.

The embodiment of this invention can be applied to a case where a destination storage area includes the same storage system as that of a source storage area when data stored in the storage area "LD-01" or "LD-61" is erased. Specifically, an identifier of the storage system 100D is stored in the destination storage system ID 10222 of the copy configuration information 1022. If there is a NULL value set in the destination storage system ID 10222, a destination storage area may be judged to exist in the same storage system.

Referring to FIG. 19, a process when a data erasure request including a destination storage area is transmitted to the storage areas "LD-01" and "LD-61" will be described. Correspondence between the processes included in the flowcharts of FIGS. 13 and 15 will be described. The storage systems 100A and 100B of FIGS. 13 and 14 correspond to the storage system 100D. Because of a process in the same storage system, a transmission process of a data erasure command is not executed (step S210 of FIG. 14).

First, a process when erasure of the storage area "LD-01" and a destination storage area of the storage area "LD-01" is requested will be described.

Upon reception of an erasure request of data stored in the storage area "LD-01" from the management computer 500, the storage controller 190 of the storage system 100D refers to the copy configuration information 1021 to judge whether the storage area "LD-01" is a source storage area "step S206 of FIG. 13). As the storage area "LD-01" is a source storage area, storage areas "LD-05", "LD-06", and "LD-07" are extracted as destination storage areas. The data stored in the storage area "LD-01" which is a target of the data erasure request is then erased (step S212A of FIG. 14).

The storage controller 190 of the storage system 100D erases data stored in the storage areas "LD-05", "LD-06", and "LD-07", respectively (step S212B of FIG. 14). As in the case of the remote copy environment, by clearing the data update information 1023 (steps S213A and S213B of FIG. 14), an increase in processing loads caused by data copying after erasure can be prevented.

Upon erasure of all the erasure target data, the storage controller 190 of the storage system 100D transmits an erasure process completion notification to the management computer 500 (step S208 of FIG. 13).

Next, a process when erasure of the storage area "LD-61" and a destination storage area of the storage area "LD-61" is requested will be described. Contents of the process are roughly similar to those of the process when the data stored in the storage area "LD-01" is erased, and thus differences will mainly be described.

A process of erasing data stored in the destination storage areas "LD-62" and "LD-64" of the storage area "LD-61" is similar to the process of erasing the data stored in the destination storage area of the storage area "LD-01" described above.

For the destination storage area "LD-63" of the storage area "LD-61", the storage areas "LD-65" and "LD-66" are destination storage areas (result of the step S211 of FIG. 14 is "Yes"). The storage controller 190 of the storage system 100D erases data stored in the storage area "LD-63" and in the storage areas "LD-65" and "LD-66" which are destination storage areas of the storage area "LD-63" according to the aforementioned procedure.

Lastly, a case of a mixture in a case where a destination storage area is provided by the same storage system as that of a source storage area and a case where a destination storage area is provided by another storage system will be described.

For a storage area "LD-51", storage areas "LD-52" and "LD-53" are included as destination storage areas in the storage system 100D. The storage area "LD-51" constitutes a remote copy environment with a storage area "LD-81" provided by a storage system 100E. Further, for the storage area "LD-81", storage areas "LD-82", "LD-83" and "LD-84" are destination storage areas.

With this configuration, in the case of erasing data stored in the storage area "LD-51" and the destination storage area of the storage area "LD-51", the storage areas "LD-52", "LD-53", "LD-81", "LD-82", "LD-83", and "LD-84" are extracted as destination storage areas. Then, according to the aforementioned procedure, all data stored in a designated storage area and destination storage areas of the storage area can be erased.

According to the embodiment of this invention, the data erasure command is transmitted to the storage system 100 which provides the source storage area. However, the data erasure command may also be transmitted to the storage system which provides a destination storage area from the management computer 500.

In the case of transmitting the data erasure command to the storage system 100 which provides the destination storage area from the management computer 500, the processing unit 580 of the management computer 500 refers to the copy configuration information 5004 to specify a destination storage system ID 50043 and a destination storage area ID 50044 of a storage area of an erasure target. To correspond to a cascade connection, if a destination storage area where the specified destination storage area is used as a source storage area exists, another destination storage area is specified.

The processing unit 580 of the management computer 500 transmits a data erasure command to the specified storage area. A command of stopping a process of copying data stored in the source storage area to the destination storage area may be transmitted to the storage system 100 which provides the source storage area before the transmission of the data erasure command.

The storage system 100 that has received the data erasure command does not have to execute the process of judging whether to provide a source storage area (step S206 of FIG. 13, and step S211 of FIG. 14), or the process of transmitting the data erasure command to the destination storage area (step S210 of FIG. 14). The process of copying the data stored in the source storage area to the destination storage area may be stopped when the data erasure command is received, or when a copy stop command transmitted from the management computer 500 is received.

In the case of transmitting the data erasure command to the storage system 100 which provides the destination storage area from the management computer 500, an erasure process completion notification is transmitted from each storage system 100 to the management computer 500.

According to the embodiment of this invention, when the data stored in the designated storage area is erased, copies of the data such as backup data can continuously be erased. To realize complete erasure including residual magnetism of backup data, security risks can be reduced by preventing data restoration.

According to the embodiment of this invention, when the data of the destination storage area provided by the storage system 100 of the remote copy destination is erased, only a data erasure command is transmitted to the storage system which provides the storage area of the erasure target. By clearing the data update information corresponding to the source storage area, transfer of dummy data written in the data-erased storage area to the destination storage area via the network is prevented, and thus an increase in network traffic can be suppressed.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
   a host computer;
   a first storage system coupled to the host computer via a network;
   a second storage system coupled to the first storage system; and
   a management computer having access to the host computer, the first storage system and the second storage system, wherein:
   the first storage system comprises a first interface coupled to the network, a first processor coupled to the first interface, and a first memory coupled to the first processor, and provides a first volume for reading and writing data to the host computer;
   the second storage system comprises a second interface coupled to the first storage system, a second processor coupled to the second interface, and a second memory coupled to the second processor, and provides a second volume for storing a copy of data stored in the first volume;
   the management computer comprises a third interface coupled to the first storage system and the second storage system, a third processor coupled to the third interface, and a third memory coupled to the third processor;
   the computer system stores copy configuration information including correspondence between the first volume and the second volume;
   the management computer transmits a data erasure request to the first storage system and a stop request to stop reading requests and writing requests to the first volume to the host computer, upon reception of an erasure request of the data stored in the first volume,
   the first storage system is configured to:
   judge whether the second volume corresponding to the first volume exists based on the copy configuration information;
   stop, if it is judged that the second volume corresponds to the first volume based on the copy configuration information, a copying process of the data stored in the first volume to the second volume before erasing the data stored in the first volume by overwriting the first volume with predetermined dummy data a plurality of times;
   transmit an erasure request of data stored in the second volume to the second storage system; and
   erase the data stored in the first volume by overwriting the first volume with predetermined dummy data a plurality of times;
   the second storage system is configured to:
   erase the data stored in the second volume by overwriting the second volume with predetermined dummy data a plurality of times, upon reception of an erasure request of the data stored in the second volume; and
   transmit a notification of the erasure of the data stored in the second volume to the first storage system;
   the first storage system is configured to:
   resume the copying process of the data stored in the first volume to the second volume; and output a notification of the erasure of the data stored in the first volume to the management computer, upon reception of the notification of the erasure of the data stored in the second volume.

2. The computer system according to claim 1, wherein:
   the first memory stores data update information indicating information regarding a difference between the first volume and the second volume for each first volume; and
   the first storage system is further configured to initialize data update information corresponding to the first volume whose data was erased upon erasure of the data stored in the first volume.

3. The computer system according to claim 2, wherein the data update information is a difference bitmap indicating data which has not been copied from the first volume to the second volume.

4. The computer system according to claim 1, wherein the management computer outputs a notification of the erasure of the data stored in the first volume and the second volume upon erasure of the data stored in the first volume and the second volume.

5. The computer system according to claim 1, wherein the first storage system is further configured to:
   provide a third volume for storing a copy of the data stored in the first volume; and
   erase data stored in the third volume in a case of erasing the data stored in the first volume.

6. The computer system according to claim 1, wherein the management computer is configured to:
   transmit a stop request to stop reading and writing requests to the first volume to the host computer upon reception of the erasure request of the data stored in the first volume before transmission of the data erasure request to the first storage system; and
   transmit a resumption request to resume reading and writing requests to the first volume to the host computer upon reception of a completion notification of the erasure of the data stored in the first volume from the first storage system.

7. In a computer system including a host computer, a first storage system coupled to the host computer via a network, a second storage system coupled to the first storage system, and a management computer having access to the host computer, the first storage system and the second storage system, a data management method for managing data stored in the first and second storage system, the data management method comprising the step of:
   providing, by the first storage system, a first volume for reading and writing data to the host computer,
   providing, by the second storage system, a second volume for storing a copy of data stored in the first volume,
   storing copy configuration information including a correspondence relation between the first volume and the second volume
   transmitting, by the management computer, a first data erasure request to the first storage system and a stop request to stop reading requests and writing requests to the first volume to the host computer, upon receiving a request to erase data stored in the first volume;
   judging, by the first storage system, whether the second volume corresponding to the first volume exists based on the copy configuration information;
   stopping, by the first storage system, a copying process of the data stored in the first volume to the second volume before overwriting the first volume with predetermined dummy data a plurality of times to erase data in the first volume, if the second volume exists;
   transmitting, by the first storage system, a second data erasure request for erasing data stored in the second volume to the second storage system;
   overwriting, by the first storage system, the first volume with predetermined dummy data a plurality of times to erase data in the first volume
   overwriting, by the second storage system, the second volume with predetermined dummy data a plurality of times to erase data in the second volume upon receiving a request to erase data stored in the second volume,
   sending, by the second storage system, a notification of the erasure of the data stored in the second volume to the first storage system,
   resuming, by the first storage system, the copying process of the data stored in the first volume to the second volume upon receiving a notification of the erasure of the data stored in the second volume; and
   outputting, by the first storage system, a notification of the erasure of the data stored in the first volume to the management computer upon receiving a notification of the erasure of the data stored in the second volume.

8. The data management method according to claim 7, further comprising the steps of:
   storing data update information indicating information regarding a difference between the first volume and the second volume for each first volume; and
   initializing, by the first storage system, data update information corresponding to the first volume whose data was erased upon erasure of the data stored in the first volume.

9. The data management method according to claim 8, wherein the data update information is a difference bitmap indicating data which has not been copied from the first volume to the second volume.

10. The data management method according to claim 7, further comprising the step of outputting, by the management computer, a notification of the erasure of the data stored in the first volume and the second volume upon erasure of the data stored in the first volume and the second volume.

11. The data management method according to claim 7, further comprising the step of:
   providing, by the first storage system, a third volume for storing a copy of the data stored in the first volume; and
   erasing, by the first storage system, data stored in the third volume in a case of erasing the data stored in the first volume.

12. The data management method according to claim 7, further comprising the step of:
   transmitting, by the management computer, a stop request to stop reading and writing requests to the first volume to the host computer upon reception of the erasure request of the data stored in the first volume before transmission of the data erasure request to the first storage system; and
   transmitting, by the management computer, a resumption request to resume reading and writing requests to the first volume to the host computer upon reception of a completion notification of the erasure of the data stored in the first volume from the first storage system.

* * * * *